(12) United States Patent
Kim et al.

(10) Patent No.: US 7,997,377 B2
(45) Date of Patent: Aug. 16, 2011

(54) CASE STRUCTURE OF INTEGRATED PACKAGE MODULE FOR HYBRID VEHICLE

(75) Inventors: Dal Kim, Suwon-si (KR); Haekyu Lim, Hwasung-si (KR); Gungoo Lee, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 268 days.

(21) Appl. No.: 12/267,759

(22) Filed: Nov. 10, 2008

(65) Prior Publication Data
US 2009/0294189 A1    Dec. 3, 2009

(30) Foreign Application Priority Data
May 27, 2008    (KR) .................. 10-2008-0049181

(51) Int. Cl.
B60L 11/00    (2006.01)
(52) U.S. Cl. ..................................... 180/312; 180/68.5
(58) Field of Classification Search .................. 180/68.5, 180/65.8; 903/952; 361/730, 733
See application file for complete search history.

(56) References Cited

U.S. PATENT DOCUMENTS

| | | | |
|---|---|---|---|
| 5,534,364 A * | 7/1996 | Watanabe et al. | 429/61 |
| 6,522,528 B2 * | 2/2003 | Yamane | 361/601 |
| 6,662,891 B2 * | 12/2003 | Misu et al. | 180/68.1 |
| 7,025,160 B2 * | 4/2006 | Awakawa | 180/68.5 |
| 7,046,535 B2 * | 5/2006 | Rodriguez et al. | 363/146 |
| 7,145,788 B2 * | 12/2006 | Plummer | 363/141 |
| 7,212,407 B2 * | 5/2007 | Beihoff et al. | 361/699 |
| 7,561,448 B2 * | 7/2009 | Katayama et al. | 363/40 |
| 7,710,721 B2 * | 5/2010 | Matsuo et al. | 361/699 |
| 7,719,838 B2 * | 5/2010 | Nakajima et al. | 361/699 |
| 7,742,303 B2 * | 6/2010 | Azuma et al. | 361/699 |
| 2007/0141454 A1 * | 6/2007 | Marukawa et al. | 429/120 |
| 2007/0284167 A1 * | 12/2007 | Watanabe et al. | 180/68.5 |
| 2008/0247133 A1 * | 10/2008 | Ito | 361/687 |
| 2009/0236162 A1 * | 9/2009 | Takasaki et al. | 180/68.5 |
| 2009/0243524 A1 * | 10/2009 | Katayama et al. | 318/400.07 |
| 2010/0025126 A1 * | 2/2010 | Nakatsu et al. | 180/65.1 |
| 2010/0173509 A1 * | 7/2010 | Holbrook et al. | 439/208 |
| 2010/0188814 A1 * | 7/2010 | Nakatsu et al. | 361/689 |
| 2010/0208427 A1 * | 8/2010 | Horiuchi et al. | 361/699 |

FOREIGN PATENT DOCUMENTS

| | | |
|---|---|---|
| JP | 9-277840 | 10/1997 |
| JP | 2004-243882 | 9/2004 |
| JP | 2005-032830 | 2/2005 |
| JP | 2005-183217 A | 7/2005 |
| JP | 2007-050887 | 3/2007 |

* cited by examiner

*Primary Examiner* — Jeffrey J Restifo
(74) *Attorney, Agent, or Firm* — Edwards Angell Palmer & Dodge LLP; Peter F. Corless

(57) ABSTRACT

A case structure of an integrated package module for a hybrid vehicle is provided. A front case of the integrated package module is formed of a first front case having a receiving groove on a upper portion thereof and a second front case. The case structure can stably mount and support the integrated package module on a vehicle body in a safer and cost-effective manner.

2 Claims, 4 Drawing Sheets

CASE STRUCTURE OF INTEGRATED PACKAGE MODULE FOR HYBRID VEHICLE

CROSS-REFERENCE TO RELATED APPLICATIONS

The present application is based on and claims priority from Korean Application Serial Number 10-2008-0049181, filed on May 27, 2008, the disclosure of which is hereby incorporated by reference herein in its entirety.

TECHNICAL FIELD

The present invention relates to a case structure of an integrated package module for a hybrid vehicle.

BACKGROUND ART

In a hybrid vehicle, a battery module, and electric and electronic components such as an inverter and a converter are incorporated in a module and this module is incorporated in a case. The module incorporated in a case is mounted and supported on a rear portion of a vehicle body.

FIG. 1 shows a front view of an integrated package module mounted on a vehicle body. That is, a substantially rectangular receiving space is formed in a rear portion of a vehicle body 1. A substantially rectangular integrated package module incorporated in a case is inserted and mounted in the receiving space. The case is provided with a substantially rectangular plate-shaped front case 2.

FIG. 2 is a rear view of the integrated package module of FIG. 1. A battery module 3 is housed in the case of the integrated package module. A mounting member 5 is used to mount and support an upper portion of a rear case 4 on the vehicle body. The mounting member 5 has a structure in which plate-shaped brackets 5b are coupled to both ends of a bar 5a extending in the width direction of the rear case 4. Both brackets 5b are fastened to the vehicle body by a plurality of bolts while bar 5a is fastened to the rear case 4 with a plurality of bolts.

The case structure has drawbacks including the following. As the front case 2 is formed as a large-sized body, a plurality of fastening bolts need to be screwed to a plurality of portions of the front case 2 to seal the case for cooling performance of the module. As a result, a large amount of labor is required for the assembling, thereby decreasing overall productivity. Also, a safety cover 2a, which is mounted on the front case 2 for operating a power relay assembly switch, can be assembled without turning on the switch by an operator's mistake in assembling or repairing the safety cover 2a, which may stop the operation of the vehicle. Further, the mounting member used to support the upper portion of the rear case 4 on the vehicle body is heavy, which increases vehicle weight and manufacturing costs.

FIG. 3 is a perspective view of another integrated package module. A case 11 of the integrated package module, which has a substantially rectangular box shape, is fastened to a rear portion of a vehicle body by a plurality of fastening bolts. An upper portion of the case 11 is fastened and supported onto a portion of the vehicle body by a mounting member 12.

This case structure also has drawbacks. For example, since a front case 11a is formed as a large-sized body, a plurality of fastening bolts need to be screwed to a plurality of portions of the front case 11a. Accordingly, a large amount of labor is required for the assembling, thereby decreasing overall productivity.

The above information disclosed in this Background Art section is only for enhancement of understanding of the background of the invention and therefore it may contain information that does not form the prior art that is already known in this country to a person of ordinary skill in the art.

SUMMARY

Embodiments of the present invention provide a case structure of an integrated package module for a hybrid vehicle which can stably mount and support the integrated package module on a vehicle body in a cost-effective manner and prevent an assembly error involving a safety cover.

In a case structure of an integrated package module according to an embodiment, a front case of the integrated package module is formed of a first front case having a receiving groove on a upper portion thereof and a second front case, which are each divided into two sections.

It is preferable that a safety cover is mounted on or near a position where the first front case and the second front case are overlapped, and the safety cover includes a plate-shaped safety cover body and a safety cover pin protruding toward the inside of the safety cover body.

A mounting member, preferably having a rectangular plate-shape, is provided, one end of which may be inserted in and fastened to the receiving groove and the other end of which nay be fastened to a vehicle body.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

For a better understanding of the nature and objects of the present invention, reference should be made to the following detailed description with the accompanying drawings, in which.

DETAILED DESCRIPTION

Figure 1:
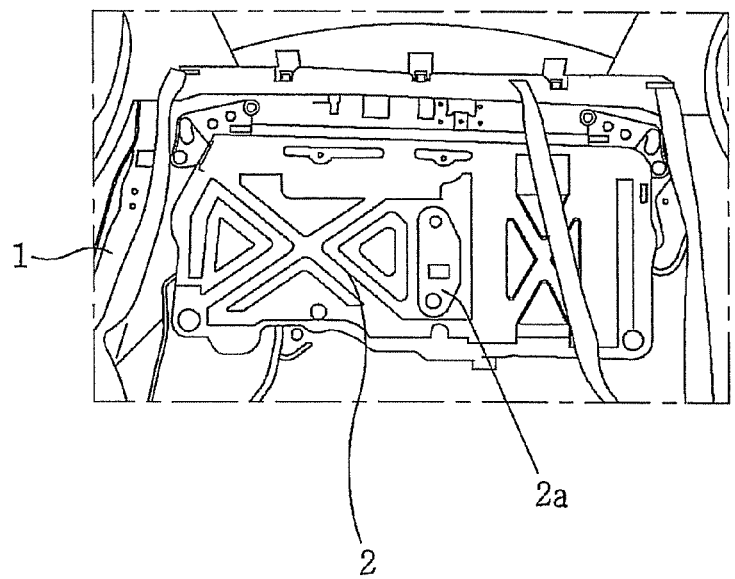
FIGS. 1 and 2 are a perspective view and a rear view of an integrated package module mounted on a vehicle body in the related art, respectively.
Figure 2:
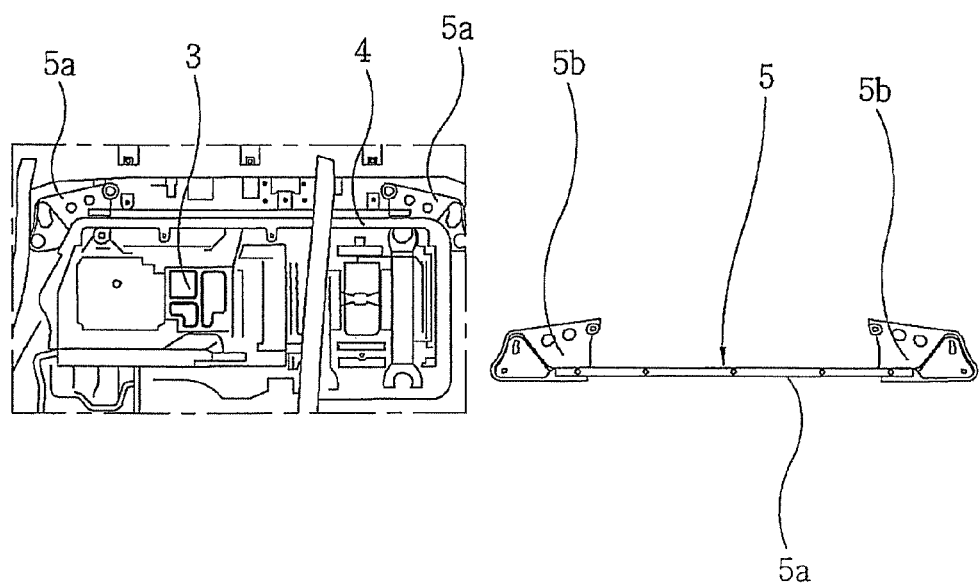
Figure 3:
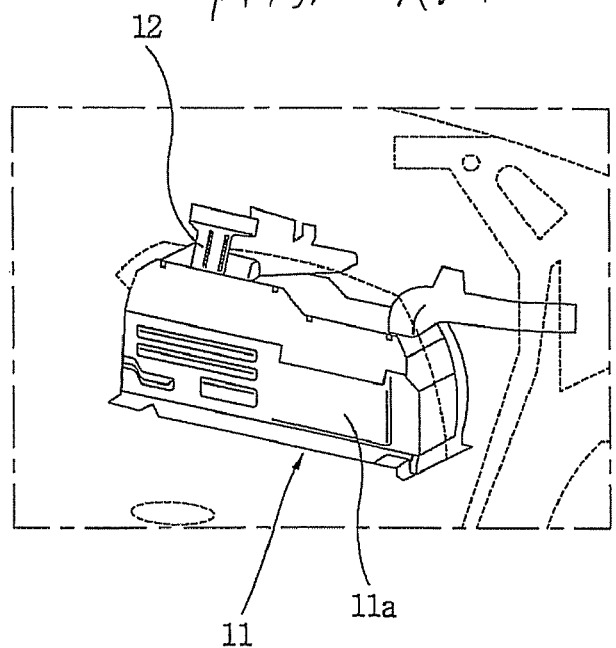
FIG. 3 is a perspective view of another integrated package module mounted on a vehicle body according to the related art.
Figure 4:
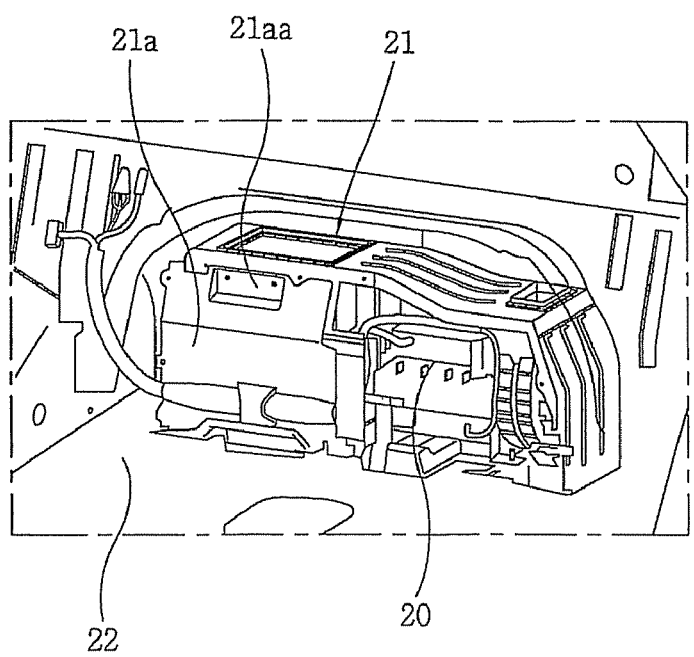
FIGS. 4 to 7 are views illustrating an integrated package module with a case according to an embodiment of the invention.

FIG. 4 is a perspective view of an integrated package module with a case structure according to an embodiment of the present invention, which is mounted on a rear portion of a vehicle body. An integrated package module 20 which includes a battery module, an inverter and a converter is fixed and mounted onto a vehicle body 22 while being surrounded by a case 21 having a rectangular box shape.

A front case of the case 21 has a first front case 21a and a second front case 21b. The first front case 21a has a rectangular plate shape with a rectangular receiving groove 21aa recessed inwardly on a upper portion thereof.

Figure 5:
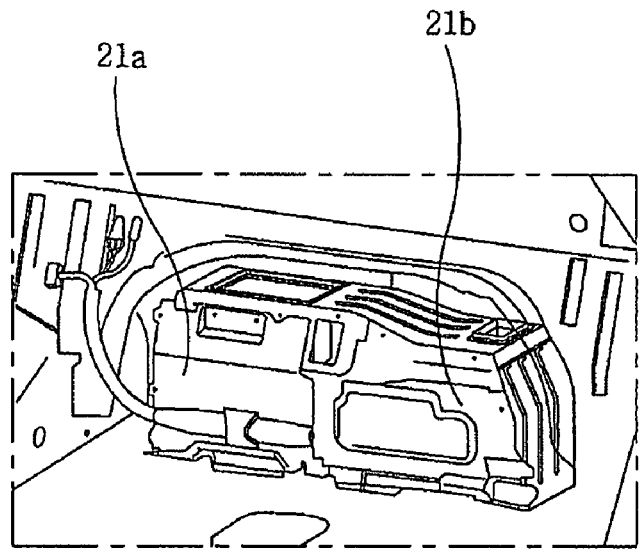

At first, the first front case 21a is supplied to an assembly line of a vehicle while being assembled. The second front case 21b supplied to the assembly line of the vehicle is fastened by a plurality of fastening bolts as shown in FIG. 5. As a result, the amount of labor required for the assembly of the front case can be reduced, thereby improving vehicle assembly productivity.

Figure 6:
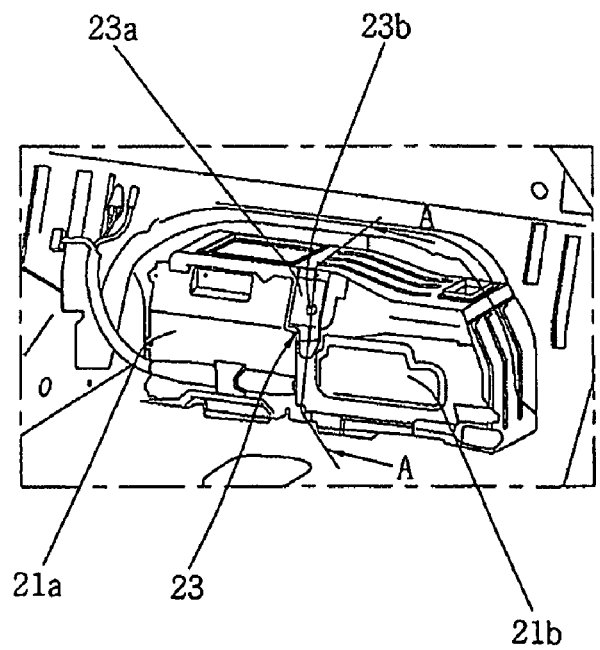

Subsequently, as shown in FIG. 6, a safety cover 23 is assembled and fastened to a position where the first front case 21a and the second front case 21b are overlapped with each other, by fastening bolts. The safety cover 23 includes a rectangular plate-shaped safety cover body 23a and a safety cover pin 23b protruding toward the inside of the safety cover body 23a.

Figure 8:
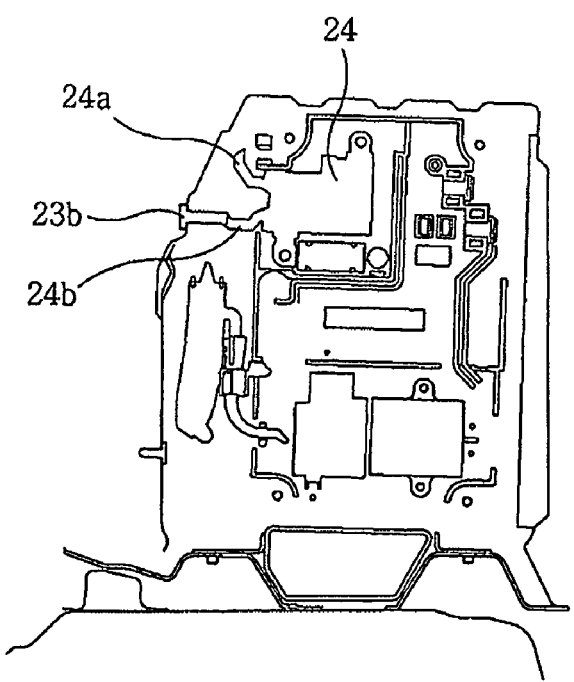
FIG. 8 is a cross-sectional view taken along the line A-A shown in FIG. 6.

When a switch operation knob of a power relay assembly 24 is at an OFF position (i.e. 24b rather than an On position 24a) as shown in FIG. 8 in assembling the safety cover 23 with the first front case 21a, the safety cover pin 23b is suspended in contact with the switch operation knob, thereby disabling the safety cover 23 to be assembled to the front case 21.

Accordingly, it is possible to prevent the safety cover 23 from being assembled to the front case 21 with a power relay switch OFF due to an operator's careless mistake.

Figure 7:
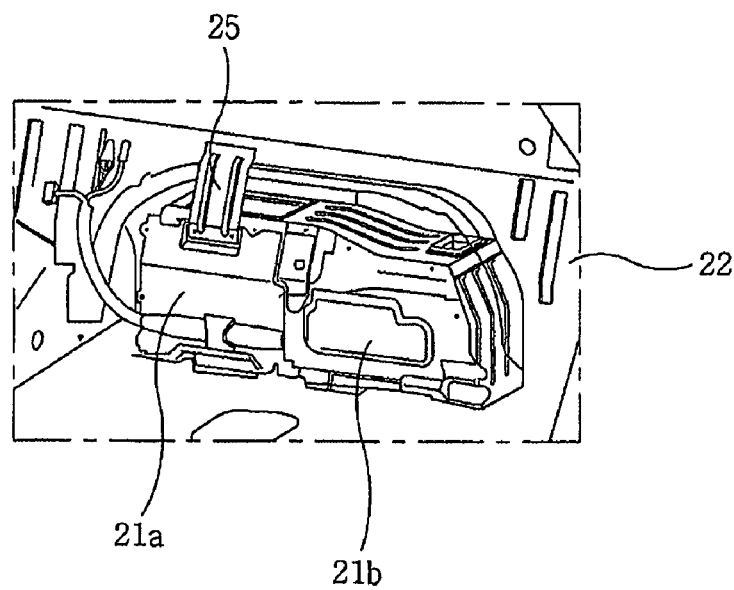

Subsequently, as shown in FIG. 7, mounting the integrated package module on a portion of the vehicle body 22 is completed by inserting one end of a rectangular plate-shaped mounting member 25 into the receiving groove 21aa of the first front case 21a and assembling the one end of the mounting member 25 using fastening bolts, and then fastening and assembling the other end of the mounting member 25 to a portion of the vehicle body 22 using fastening bolts. The size of the mounting member 25 can be reduced as compared with the related art, which may reduce the vehicle weight and manufacturing costs.

What is claimed is:

1. A case structure of an integrated package module, wherein a front case of the integrated package module is formed of a first front case having a receiving groove on a upper portion thereof and a second front case, which are each divided into two sections, wherein a safety cover is mounted on or near a position where the first front case and the second front case are overlapped, and the safety cover includes a plate-shaped safety cover body and a safety cover pin protruding toward the inside of the safety cover body and when a power relay switch is OFF, the safety cover pin protrudes toward the inside of the safety cover body such that the safety cover pin is suspended in contact with an operation knob of the power relay switch to thereby disable the safety cover to be assembled.

2. The case structure as defined in claim 1, wherein one end of a rectangular plate-shaped mounting member is inserted in and fastened to the receiving groove and the other end of the mounting member is fastened to a vehicle body.

* * * * *